United States Patent Office 3,464,940
Patented Sept. 2, 1969

3,464,940
ADHESIVE BLENDS COMPRISING POLYAMIDE AND CHLORINATED ETHYLENE-VINYL ACETATE COPOLYMER
Oliver A. Barton, Florham Park, and Tibor G. Pusztai, Verona, N.J., assignors to Allied Chemical Corporation, New York, N.Y., a corporation of New York
No Drawing. Filed Jan. 7, 1966, Ser. No. 519,294
Int. Cl. C09j 3/14, 3/16
U.S. Cl. 260—23          6 Claims

ABSTRACT OF THE DISCLOSURE

A polymer containing adhesive composition wherein said polymer consists of a mixture of from about 25 to about 85% by weight of chlorinated ethylene-vinyl acetate copolymer having a molecular weight of up to 40,000, a vinyl acetate content of up to 30% and a chlorine content of up to 40% and correspondingly from about 75 to about 15% by weight of a polyamide, having an amine number of at least 20, of the formula

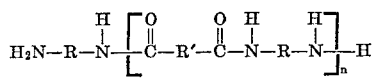

wherein R and R' are divalent aliphatic hydrocarbon radicals and wherein n is 1 to 6, is exceedingly effective at bonding inert plastics such as polyethylene, polyfluorocarbons and polyesters.

---

This invention relates to novel adhesive compositions for nonpolar plastics. More particularly, this invention relates to novel adhesive compositions for bonding nonpolar plastics, said adhesive compositions containing polyamide and chlorinated ethylene-vinyl acetate resins.

A commercially acceptable adhesive must be applicable rapidly and with ease, and have good bond strength. This means that it must have a low viscosity at the time of application so that it can wet the surface to be bonded quickly and uniformly. Thereafter, the adhesive must solidify to form a tough layer bonding the several parts together. This can be done by applying the adhesive as a hot melt which solidifies on cooling; by applying the adhesive as a solution and thereafter removing the solvent by evaporation or absorption; or by applying, as a low molecular weight polymeric system capable of being cured or further polymerized, to a solid polymer.

The search for adhesive compositions to bond inert nonpolar plastics such as polyethylene, polyfluorocarbons, polyesters, and the like, together or to each other has been continued for some years with little success. Certain polyamide resins, which are viscous liquids prepared by a condensation reaction of a dimerized drying oil acid and an aliphatic diamine, form good bonds with the above-mentioned inert plastics. However, they are unsatisfactory for commercial use because of their high degree of tackiness which causes them to stick to everything indiscriminately and makes the application of uniform thin films impossible without the use of pressure. A nontacky adhesive is highly desirable for use on plastic films and tapes so that the film or tape can be rolled up for storage until ready for use.

It is an object of the invention to improve the handling characteristics by reducing the tackiness of the aforementioned polyamides.

It is another object of this invention to provide novel adhesive compositions for nonpolar plastics, which adhesives are nontacky, easy to apply, and form good bond strengths.

It has been discovered that, when a chlorinated copolymer of ethylene and vinyl acetate is added to a polyamide resin having an amine number, as defined below, of at least 20, and preferably in the range of 60 to 500, the tackiness of the polyamide resins is reduced resulting in adhesive compositions suitable for nonpolar plastics. These compositions can be applied from the melt or can be, in accordance with the preferred method of application, dissolved in a suitable solvent that reduces the viscosity, improves the ease of application, and promotes uniform thickness of thin layers.

The chlorinated copolymers of ethylene and vinyl acetate employed in the invention have a maximum weight-average molecular weight of 40,000, a maximum vinyl acetate content of 30% by weight, and a maximum chlorine content of about 40% by weight. They can be prepared acording to the process disclosed in copending United States patent application Ser. No. 425,348, filed Jan. 13, 1965, now abandoned, whereby finely divided ethylene-vinyl acetate copolymers are slurried in water in an appropriate reactor and chlorine is added at a constant rate until the desired chlorine level is reached. The chlorination reaction is carried out at low temperatures of 70° C. or less.

The polyamides employed in the invention are of the general formula

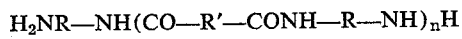

in which R and R', independently, are divalent aliphatic radicals corresponding, respectively, to the amines and the acids, esters, or anhydrides used in the preparation of the polyamides, and n is a cardinal number usually less than 6. The preparation and structures of these compounds is discussed in U.S. Patent Nos. 2,379,413 and 2,450,940. The polyamides are generally prepared from dibasic acids, or mixture of dibasic acids, obtained by heating and dimerizing unsaturated long-chain acids initially containing 16 to 22 carbon atoms. These acids can be conveniently derived from dry and semidrying oils such as soybean, corn, linseed, tung, and perilla oils. These dimers are then heated with an excess of an aliphatic primary diamine, preferably containing 2 to 6 carbon atoms, such as ethylene diamine, hexamethylene diamine, and tetramethylene diamine. These products are, in general, tacky resins or very viscous liquids. They are usually mixtures of two or more compounds of the above formula, and are characterized chemically by their amine value which is defined as the number of milligrams of KOH equivalent to the base content of one gram of resin, as determined by titration with HCl. Thus, the higher the amine value, the lower the average molecular weight. It is assumed that only the terminal —NH₂ groups contribute to the amine value, consequently, the greater number of short length chains, the greater the amine value. The amine value divided by 56 gives the number of milliequivalents corresponding to one gram of the polyamide. Only polyamides of the aforementioned type are known to have an amine value. As it will be shown hereafter, the polyamides useful for the present invention should have a minimum amine number of about 20 and a maximum value of up to 500. While these polyamides can be used as adhesives, by themselves, they are too viscous and tacky and are difficult to handle.

The optimum mol ratio of chlorinated copolymer of ethylene and vinyl acetate to polyamide has to be determined for each substrate combination to be bonded and for the particular polyamide used in the adhesive. For instance, polyamides which are liquid at room temperature and have the most tack will require the addition of at least about 65% and up to 85% by weight of the chlorinated copolymer of ethylene and vinyl acetate to reduce the high tackiness of the polyamide to an acceptable level, whereas a more viscous, less tacky polyamide will require as little as 25% by weight of the chlorinated copolymer of ethylene and vinyl acetate to be added to obtain a similar result. The chlorine content of the chlorinated copolymer of ethylene and vinyl acetate, preferably, is at least about 10% by weight, since resins with higher chlorine content generally produce higher strength bonds.

The composition of the solvent, if any is to be employed, is not critical and can vary within wide limits, except that all the resin should be dissolved. The polyamide resins, described above, are soluble in the common aromatic solvents such as benzene, toluene, xylene, and the like. The chlorinated copolymers of ethylene and vinyl acetate are soluble in the halogen-substituted solvents such as carbon tetrachloride, monochlorobenzene, o-dichlorobenzene, etc. In addition, a miscible solvent such as the low boiling aliphatic alcohols or ethyl acetate can be used as a diluent to adjust the total solids content of the solution as desired. Any combination and proportion of solvents can be employed provided a complete solution is obtained. A dilute solution of about 15% to about 25% polymer content is preferred as it improves the ease of application and wettability of the adhesive composition and promotes the formation of an adhesive layer of uniform thickness.

In a preferred process, an appropriate proportion of chlorinated copolymer of ethylene and vinyl acetate, and of the polyamide resin, as hereinbefore described, are dissolved in a suitable solvent mixture. The temperature of the solvent can be raised to accelerate the rate of solution up to about 70–80° C. The solution is then applied in any convenient manner in uniform thickness to the substrate to be bonded, the other part to be bonded is then contacted with the adhesive layer on the substrate, preferably with a minimum of pressure. If desired, the substrate can be enclosed in a suitable assembly to prevent the liquid adhesive mixture from seeping out from between the joint. Heat is then applied to evaporate the solvent mixture. The temperature to be used will depend upon the solvent and the substrate used and should be higher than the boiling point of the solvent and yet not so high as to exceed the decomposition temperature of the substrate. Preferably the temperature should be kept at a minimum so that the solvent should not boil off too rapidly and thereby cause bubbles or voids to form in the adhesive layer.

If desired, pigments such as titanium dioxide, clay, zinc oxide, carbon black, and the like, can be added to the adhesive of the invention in amounts up to 40% by weight, preferably up to about 20–25% by weight, of the adhesive composition.

The following examples are given to further illustrate the invention, but it is to be understood that the invention is not to be limited to the details described therein. Peel strength was measured at room temperature on a standard Instron tensile tester according to ASTM test D1876. The results are given as pounds per inch at head speeds of 10 inches per minute. The ultimate elongation, ultimate tensile strength, and 2% secant modulus were determined according to ASTM test D638–61T. The tensile impact was determined according to ASTM test D1822–61T and it is expressed as foot-pounds per square inch.

EXAMPLE 1

Part A.—A quantity of solid ethylene-vinyl acetate copolymer having a weight average molecular weight of about 4200, an intrinsic viscosity of 0.18, vinyl acetate content of 16.6% by weight, melting point of 92°–100° C., melt viscosity of 600 centipoises at 140° C., melt index, as determined by ASTM test D1238–62T, of about 1000, and polyethylene crystallinity of 15% was ground to pass through a 40-mesh U.S. Standard sieve. Water was added to give a slurry density of 5.3% by weight of solids and the slurry was charged to a 20-gallon, jacketed glass-lined reactor fitted with an agitator, gas feed lines, pressure recording instrument, thermowell, and appropriate valves and pipes. Chlorine was supplied from a cylinder, which rested on a platform scale so that the weight of chlorine fed to the reactor could be measured. The chlorine was analyzed for oxygen and contained less than 50 parts per million. The reaction system was purged of air with a nitrogen sweep and the temperature of the system brought to 30° C. Chlorine was added at a rate of 0.162 pound chlorine per pound copolymer per hour until a total of 33.4% chlorine had been added to the resin. During the chlorination, the pressure remained well below 100 p.s.i., indicating a good rate of chlorine takeup by the copolymer.

The resin thus obtained had an intrinsic viscosity, as determined according to ASTM D1601–61, of 0.17, and a glass transition temperature of 12° C. as determined according to ASTM test D1043–61T, the glass transition temperature being defined as the temperature where the modulus of rigidity is 14,500 p.s.i. The ultimate elongation was 169%, ultimate tensile strength 400 p.s.i., 2% secant modulus 5200, and tensile impact 2.5 ft.-lbs./in.$^2$.

Part B.—34 grams of the chlorinated resin of Part A and 66 grams of a polyamide having the tradename Versamid 100, believed to be essentially the condensation product of the dimer of linoleic acid with ethylenediamine, having an amine value of 89–93, a viscosity of 7–12 poises at 150° C., as determined by a Brookfield viscometer, and a softening point of 45–53° C., determined according to ASTM E28–58T, were dissolved in a mixture of toluene and monochlorobenzene in an 80:20 ratio by weight. The mixture was warmed to about 70° C. to aid solution of the resins. The clear solution obtained was cooled to room temperature and 121.6 grams ethyl acetate was stirred in. A 2-mil thick layer of this composition was spread onto a 10-mil modified trifluorochloroethylene film having the trademark Aclar 33. A 1-mil film of Aclar 33 has, by itself, a break strength of 6–10 pounds, as determined in accordance with ASTM test D882–64T. The coated film was inserted into a flat heating press having sides to prevent the liquid adhesive from overflowing. A second 10-mil film of Aclar was contacted to the adhesive and the solvent was evaporated by heating the press to 120° C. for one minute, without pressure. The peel strength of the bond was 5.9 pounds.

EXAMPLES 2–3

Adhesive compositions were prepared in a similar manner as in Example 1, using 40 grams of the copolymer of Example 1, Part A, to 60 grams of Versamid 100 in Example 2, and in Example 3 using equal quantities by weight. Peel strength of a 2-mil layer between modified trifluorochloroethylene films thus bonded, was 4.2 and 4.7 pounds, respectively, in those examples. Versamid 100 alone, applied as a 50% solution in toluene, had a peel strength of 4.8 pounds.

EXAMPLES 4–6

An adhesive composition containing 40 grams of the chlorinated copolymer of ethylene and vinyl acetate prepared as in Example 1, Part A, and 60 grams of Versamid 100 was prepared in similar manner as in Example 1, Part B. A 2-mil coating of the solution was spread onto 10 mil thick substrate films of various materials, with various materials bonded thereto. The samples were tested for peel strength, except that in the case of polyethylene substrate a solvent evaporation temperature of 100° C. was used instead of the 120° C. used with the other materials. A 1-mil film of the polyamide substrate used had a break strength of 8 to 13 pounds. As substrate, also polyethylene film having a break strength of 2 to 2.5 pounds was used. The polyethylene substrate had the tradename Dow-112, and the polyamide was a nylon 6 material having the trade name Capran-77C. The results are given in the table below:

| Substrate/bonded layer | Peel strength, pounds | |
|---|---|---|
| | Adhesive of invention | Versamid 100 alone |
| Ex. 4—Polyethylene/Polyethylene | 3.7 | 1.2 |
| Ex. 5—Modified trifluorochloroethylene/same | 2.8 | 2.4 |
| Ex. 6—Polyamide/modified trifluorochloroethylene | 3.2 | |

EXAMPLES 7–8

The ethylene-vinyl acetate copolymer of Example 1, Part A, was chlorinated in a similar manner, but now to a chlorine content of 21.0% by weight. The resultant resin had an intrinsic viscosity of 0.19 and a glass transition temperature of −14° C.

In Example 7, 81 grams of the above-described chlorinated copolymer and 19 grams of a polyamide having the trade name Versamid 140, an amine value of 350–400, a viscosity of 2–6 poises at 75° C. and which is fluid at room temperature, were dissolved as in Example 1, as control. In Example 8, 70 grams of resin to 30 grams of Versamid 140 were used. The peel strength between modified trifluorochloroethylene films was 3.2 for Example 7, and 4.8 for Example 8. The peel strength of Versamid 140 alone, applied as a 50% solution in toluene, was only 1.7 pounds.

EXAMPLE 9

The ethylene-vinyl acetate copolymer of Example 1, Part A, was chlorinated in a similar manner, but now to a chlorine content of 5.6%. The resultant resin had an intrinsic viscosity of 0.20, a glass transition temperature of −28° C., ultimate elongation of 10%, ultimate tensile strength of 330 p.s.i., 2% secant modulus of 3980, and tensile impact of 30 ft.-lbs./in.$^2$.

Equal weights of the above-described resin and Versamid 100 were dissolved and applied between 10-mil films of modified trifluorochloroethylene as in Example 1, Part B. The peel strength of the bond was 2.0 pounds.

EXAMPLES 10–12

An ethylene-vinyl acetate copolymer having a vinyl acetate content of 7.6% by weight, an intrinsic viscosity of 0.18, melt viscosity of 260 centipoises at 140° C., weight average molecular weight of 4200, melt index of about 1000, and polyethylene crystallinity of 15%, was chlorinated at 45° C. at a rate of 0.317 pound of chlorine per pound of copolymer per hour. Total reaction time was 5.25 hours. The resultant resin had a chlorine content of 32.2% and an intrinsic viscosity of 0.15.

An adhesive composition was prepared by mixing the above-described resin with Versamid 100 in a weight ratio of 65.35, and then spread to a thickness of 0.6 mil on various substrates. The following results were obtained:

| Substrates/bonded layer: | Peel strength, pounds |
|---|---|
| Ex. 10—Modified trifluorochloroethylene/same | 4.0 |
| Ex. 11—Polyethylene/polyethylene | 3.4 |
| Ex. 12—Modified trifluorochloroethylene/polyethylene | 3.3 |

Control A.—A solution of 50% by weight of a polyamide having the trade name Versamid 900 and an amine value of 3, in a solvent mixture containing 60% by weight isopropanol and 40% by weight toluene, was applied in a 2 mil thickness to a 10 mil film of modified trifluorochloroethylene. The solvent was removed by heating at 120° C. for 15 minutes. Another 10 mil film of modified trifluorochloroethylene was contacted to the Versamid layer and heated at 120° C. for 2 minutes without added pressure. No adhesion was obtained.

We claim:
1. A polymer containing adhesive composition wherein said polymer consists of a mixture of from about 25 to about 85% by weight of chlorinated ethylene-vinyl acetate copolymer having a molecular weight of up to 40,000, a vinyl acetate content of up to 30% and a chlorine content of up to 40% and correspondingly from about 75 to about 15% by weight of a polyamide, having an amine number of at least 20, of the formula

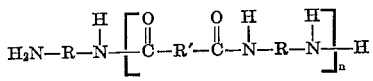

wherein R and R′ are divalent aliphatic hydrocarbon radicals, wherein R has from 2 to 6 carbon atoms and wherein R′ has from 30 to 42 carbon atoms, and $n$ is 1 to 6.

2. A composition in accordance with claim 1 wherein said polyamide has an amine number ranging from 60 to 500.

3. A composition in accordance with claim 1 wherein said chlorinated ethylene-vinyl acetate copolymer has a chlorine content of at least 10% by weight.

4. A composition in accordance with claim 1 having additionally incorporated therein a solvent for said polymer mixture.

5. A composition in accordance with claim 4 wherein said solvent comprises up to about 85% by weight of said composition.

6. A composition in accordance with claim 1 having additionally incorporated therein a pigment selected from the group consisting of zinc oxide, titanium dioxide, clay, carbon black, and mixtures thereof, wherein said pigment is present in an amount of up to 40% by weight of said polymer.

References Cited

UNITED STATES PATENTS 3,308,076  3/1967  De Lia et al. _____ 260—18
3,345,315  10/1967  Barton et al. _____ 260—23

DONALD E. CZAJA, Primary Examiner

R. A. WHITE, Assistant Examiner

U.S. Cl. X.R.

156—331; 260—31.2, 33.6, 33.8, 41, 87.3, 857, 897